June 24, 1958 N. ORLANDI 2,840,387
CABLE CONTROL AUTO BODY LEVELING DEVICE
Filed Aug. 15, 1956
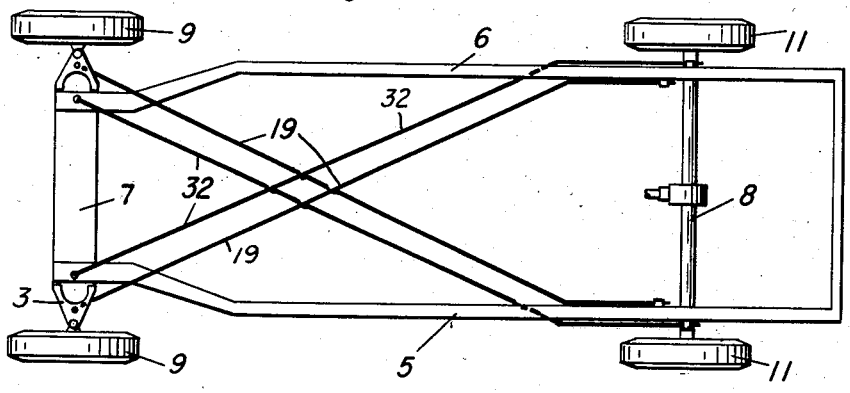
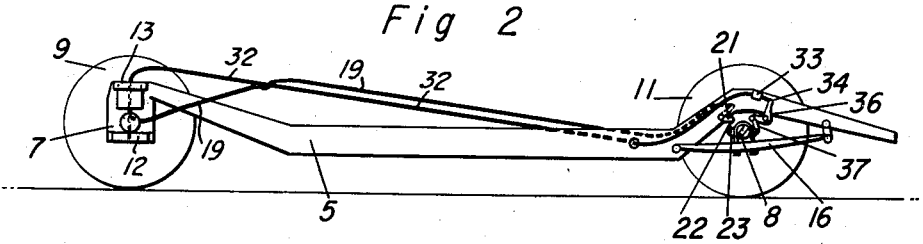
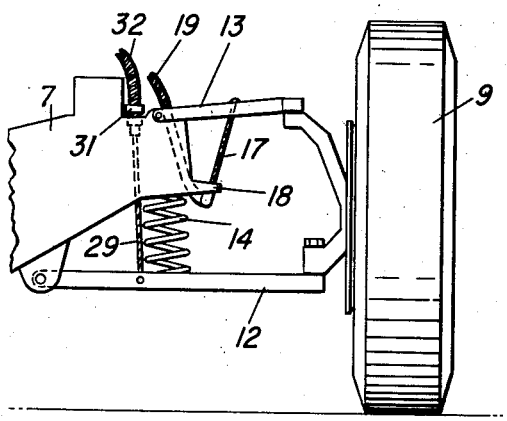
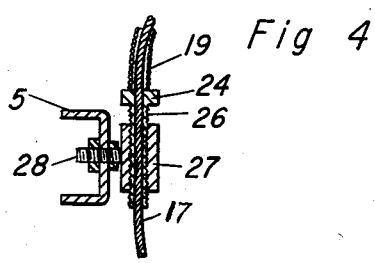
INVENTOR.
Nello Orlandi
BY
Att'y

2,840,387

CABLE CONTROL AUTO BODY LEVELING DEVICE

Nello Orlandi, San Francisco, Calif.

Application August 15, 1956, Serial No. 604,244

1 Claim. (Cl. 280—104)

This inventon relates to improvements in auto body leveling devices and has particular reference to means for maintaining the chassis of a motor vehicle in a substantially level condition during its travel over a highway which may have inequalities in its surface.

A further object is to produce a device of this character which may be attached to any standard make of motor vehicle without materially altering its construction.

A still further object is to produce a device of this character which is automatic in operation so that it is not necessary for the user of the device to manipulate any mechanism to effect the leveling operation.

Other objects and advantages will be apparent during the course of the following description.

In the accompanying drawings forming a part of this specification and in which like numbers are employed to designate like parts throughout the same, Fig. 1 is a top plan view of a vehicle frame and the wheels and axle thereof, having my invention applied thereto;

Fig. 2 is a side elevation of Fig. 1 with the near wheels removed;

Fig. 3 is an enlarged fragmentary front elevation of one of the wheels and leveling mechanisms; and Fig. 4 is a vertical cross sectional view of one of the individual leveling cable adjusters.

My invention contemplates the use of cross connections between the front and rear wheels or diagonal corners of the vehicle to effect a leveling action similar to that described in my Patent No. 2,708,120 dated May 10, 1955.

It is a well known fact that when a motor vehicle encounters a rough surface or when there is the tendency to tip or tilt as the vehicle rounds a corner, this tilting action causes a rider in the vehicle to have an unpleasant sensation.

It is applicant's desire to provide means for overcoming the tendency of the auto body to tilt with respect to the highway surface, so that when, for instance, a vehicle goes around a curve, the auto body will remain practically level with respect to the road surface and consequently there will be no centrifugal action tending to throw the body to one side or the other.

This of course applies only when the curve is banked, as is now the general practice. When a curve is not banked, it is necessary to slow down to such a speed that the centrifugal force is relatively nil.

In the accompanying drawings, wherein for the purpose of illustration is shown a preferred embodiment of my invention, the numerals 5 and 6 designate the side frame members of a vehicle having a front crossbeam 7 and rear axle 8. The front crossbeam supports the customary front wheels 9 and the rear axle the customary wheels 11. The front wheels 9 are suspended from the beam 7 by a pair of vertically disposed yokes as shown at 12 and 13 and springs supported by a compression spring 14, while the rear axle is supported by leaf springs 16.

The construction thus far described is common to all motor vehicles and is no part of my invention.

My invention consists of a cross cable arrangement wherein, for instance, a cable 17 is secured to the yoke 13 and passes downwardly through an ear 18 formed upon the frame and thence enters a cable housing 19. The opposite end of this cable is in turn attached to a bell crank lever 21 mounted on the frame 6 just forward of the rear axle 8. The opposite end of the bell crank lever is connected by a cable 22 to a lug 23 formed on the rear axle 8.

It is to be here noted that the cable housing 19 (see Fig. 4) bears against the head 24 of an adjusting screw 26 threadily mounted in a fixture 27 secured by an offset bolt 28 to the frame 5. Therefore by adjusting the screw 24 pressure may be brought to bear on the cable housing thus effecting a pull on the cable 19 to cause a leveling action when the vehicle is setting on a level surface.

Referring again to Fig. 3, I have shown a second cable 29 which is connected to the yoke 12 and passes upwardly through a leveling screw 31 against which the cable housing 32 rests with the opposite end of the housing crossing and extending through the frame member 6 and having its free end secured to the frame as shown at 33, the free end of the cable in the housing extending outwardly and connected as at 34 to the free end of the bell crank lever 36 which is connected by a link 37 to a lug formed on the rear of the axle 8.

A similar arrangement extends between the left side of the beam 7 and the right side of the rear axle so that there is a cross connection between the beam 7 and the rear axle on both sides.

The result of this construction is that supposing, for instance, that the right front wheel tends to move upwardly, the cable 17 will cause a pull to be transmitted therethrough to the bell crank 21, thus pulling down on the frame toward the rear axle on the opposite side of the vehicle. Should the right front wheel tend to move downwardly away from the frame, then the cable 29 will cause a pull on the ball crank lever 34 and tend to push the rear axle away from the frame.

There is a definite reversal in movement between the front beam and rear axles on opposite sides which reversal in movement will tend to compensate for any tendency of the frame to tilt with relation to the auto body as when proceeding around a curve.

If both of the connected wheels move upwardly at the same time with relation to the frame, it is obvious that the unenclosed ends of the cable will bend to relieve the opposed pressure. It is also obvious that in the acceleration or the stopping of the car, the body of the vehicle will not pitch either forwardly or backwardly but will remain level through the interconnecting cable arrangement.

Also, when the vehicle is unevenly loaded, the device will act to hold the frame level.

It will thus be seen that my invention accomplishes all of the objects above set forth. It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

A leveling device for a vehicle having a frame and front and rear ground-engaging wheels resiliently connected thereto, said front wheels being connected to said frame by a pair of spaced yokes, said rear wheels being connected together by a rear axle, of a cable connected to the upper of each of said yokes and extending downwardly through an eye on said frame, thence diagonally rearwardly to the opposite rear side of said frame, a bell crank lever secured to each side of said frame, one end of said bell crank lever being connected to its respective cable, and a link connecting each of said bell crank levers with said adjacent end of said axle, a second cable connected to each of the other of said yokes and extending diagonally to the opposite rear side of said frame, a second bell crank lever pivoted to said frame, the end of the last mentioned cable being connected to the respective last mentioned bell crank lever, the free end of said last mentioned bell crank levers being connected to the adjacent ends of said axle and to the opposite side of said axle from said link connections and an adjustable flexible cable housing surrounding each of said cables.

References Cited in the file of this patent

UNITED STATES PATENTS

| | | |
|---|---|---|
| 1,313,167 | Cosgrove | Aug. 12, 1919 |
| 1,759,354 | Jackson | May 20, 1930 |